United States Patent
Moreno et al.

(10) Patent No.: US 6,772,120 B1
(45) Date of Patent: Aug. 3, 2004

(54) COMPUTER METHOD AND APPARATUS FOR SEGMENTING TEXT STREAMS

(75) Inventors: Pedro J. Moreno, Cambridge, MA (US); David M. Blei, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 09/718,177

(22) Filed: Nov. 21, 2000

(51) Int. Cl.$^7$ .......................... G10L 15/14; G06F 17/27
(52) U.S. Cl. ........................................... 704/256; 704/9
(58) Field of Search ................................ 704/236, 240, 704/242, 245, 250, 255, 256, 1, 9, 257

(56) References Cited

U.S. PATENT DOCUMENTS

| | | | | |
|---|---|---|---|---|
| 6,052,657 A | * | 4/2000 | Yamron et al. ................. | 704/9 |
| 6,104,989 A | * | 8/2000 | Kanevsky et al. ............. | 704/9 |
| 6,374,217 B1 | * | 4/2002 | Bellegarda ................... | 704/240 |
| 6,405,188 B1 | * | 6/2002 | Schwartz et al. ............. | 707/3 |

OTHER PUBLICATIONS

Hofman, T. and J. Puzicha, "Unsupervised Learning from Dyadic Data," *Neural Information Processing Systems*, 11, 1999 (34 pp.).

Hofman, T., "Learning the Similarity of Documents: An Information–Geometric Approach to Document Retrieval and Categorization," in *Advances in Neural Information Processing Systems 12*, pp. 914–920, MIT Press (2000).

Hofman, T., "Probabilistic Latent Semantic Indexing," *Proceedings of the Twenty–Second Annual International SIGIR Conference on Research and Development in Information Retrieval*, 1999 (8 pp.).

van Mulbregt, P., et al., Segmentation of Automatically Transcribed Broadcast News Text, by Dragon Systems, Inc. 1998.

Beeferman, D. et al., "Text Segmentation Using Exponential Models," *Proc. Empirical Methods in Natural Language Processing 2 (AAAI)*, 1997 (12 pp.).

* cited by examiner

Primary Examiner—Tālivaldis Ivars Šmits
Assistant Examiner—Lamont Spooner

(57) ABSTRACT

Computer method and apparatus for segmenting text streams is disclosed. Given is an input text stream formed of a series of words. A probability member provides working probabilities that a group of words is of a topic selected from a plurality of predetermined topics. The probability member accounts for relationships between words. A processing module receives the input text stream and using the probability member determines probability of certain words in the input text stream being of a same topic. As such, the processing module segments the input text stream into single topic groupings of words, where each grouping is of a respective single topic.

4 Claims, 2 Drawing Sheets

COMPUTER METHOD AND APPARATUS FOR SEGMENTING TEXT STREAMS

BACKGROUND OF THE INVENTION

Multimedia streams (with related audio), long text documents and long Web pages often cover several topics. For example, a radio program that lasts two hours usually contains fifteen or so separate stories. Often the only way to decide where in the document/audio or text stream a break point occurs is by human intervention. Human listeners/readers have to decide by hand where these break points occur and what they talk about. Automating this task can be beneficial especially for providing easy access to indexed multimedia documents. Several techniques exist that can perform this task but they all have shortcomings.

There are two well documented statistical methods for this task. The first one is based on exponential models. The second is based on Hidden Markov Models.

Exponential models (D. Beeferman, A. Berger and J. Lafferty, "Text segmentation using exponential models" in *Proc. Empirical Methods in Natural Language Processing* 2 (*AAAI*), 1997, Providence, R.I.) are built by combining weighted binary features. The features are binary because they provide a 1.0 score if they are present or a 0.0 score if not present. A learning procedure (typically a greedy search) finds how to weight each of these features to minimize the cross entropy between segmented training data and the exponential model. These features are typically cue-word features. Cue-word features detect the presence or absence of specific words that tend to be used near the segment boundaries. For example, in many broadcast programs, words or sentences like "and now the weather" or "reporting from" tend to indicate a transition to a next topic.

While this approach is very successful, it has several drawbacks. First it requires segmented data where boundaries among topics are clearly marked; second it is extremely computationally demanding; and finally among the features used are text formatting features such as paragraph indenting, etc., which may not be available on text produced by a speech recognition system. Furthermore, the cue-word features are not very tolerant of speech recognition processing since often ASR (automated speech recognition) systems make mistakes and cue-words might not be detected. A final drawback of exponential models is that they only provide segmentation information and no topic labels are assigned to segments.

The hidden Markov model (HMM) approach was pioneered by Dragon Systems in the late 1990's (P. van Mulbregt et al., "Text Segmentation and Topic Tracking on Broadcast News via a Hidden Markov Model Approach, International Conference of Spoken Language Processing 2000, Sydney, Australia). It models the statistics of textual sources with a naive Bayes method (word order is not considered) which is probabilistically generated by a hidden state variable, the topic. The parameters of the HMM are the topic probability $P(w|z)$ (w represents a word and z represents a topic) and the transition probability from one topic/state to another topic/ state $P(z|z')$. $P(w|z)$ is trained by building smoothed unigram language models from a marked corpus of documents. The transition probability matrix $P(z|z')$ is computed by counting transitions from one topic to another in the labeled training corpora. During testing Viterbi decoding is used and like in any HMM system, topic breaks occur when the value of the state changes from one topic to another.

Each document is converted into a histogram (e.g., the number of occurrences of each word in the document are counted) and scored against the topic based unigram. This score is computed by assuming total independence among words, i.e., $P(document|z)=\Pi_{words}P(w_i|z)$. Naturally, many of the words are not present in a document. For example, if the dictionary of words one uses consists of 60,000 unique words and the document has only 2,000 words, there will be at least 58,000 zeros in the unigram histogram. This sparsity in the document feature vector generates several problems and some sort of smoothing of the histogram $P(w|z)$ is always needed.

One problem with this framework is that it requires a training corpus which is segmented and categorized. Segmented corpora are easy to build or acquire but categorized corpora are sparse and expensive. To address this, Dragon Systems cluster their training using a simple k-means algorithm and a vector model of documents. Then, they manually label each segment with its associated cluster and train their HMM as described above.

The HMM is a good framework for breaking up streams of text into segments that are self-similar, i.e., cover a single topic, but the Dragon Systems implementation is rather heuristic. In separate steps and with different algorithms, they cluster their training data, build and smooth unigram language models and tune the penalty for topic transitions. All these steps require manual tuning and an expert to decide what parameters are appropriate.

SUMMARY OF THE INVENTION

The present invention provides computer method and apparatus for segmenting text streams into "documents" or self-similar segments, i.e., segments which cover a respective single topic. As used herein the term "document" is a collection of words that covers a single topic. There are databases with streams of documents where the boundaries between documents are known. Notice that there is no rule against two consecutive documents belonging to the same topic. Often these individual documents are called "segments". There are also streams of text where the boundaries between topics are not known. In these situations Applicants arbitrarily break the stream of text into windows or pseudo-documents of L words (typically L=30). Each of these pseudo-documents is assumed to cover a single topic. The goal of the invention is to decide where there is a change of topic in the stream of pseudo-documents.

In the preferred embodiment, computer apparatus for segmenting text streams, comprises a probability member and a processing module. The probability member provides working probabilities of a group of words being of a topic selected from a plurality of predetermined topics. In particular, the probability member provides the probability of observing each of the topics and the probability of a document being of one of the predetermined topics. The probability member accounts for relationships between words.

The processing module receives an input text stream formed of a series of words. Next, using the probability member, the processing module determines the probability of certain words in the text stream being of a same topic. To that end, the processing module segments the text stream into single topic groupings of words (i.e., documents), where each grouping is of a respective single topic.

In accordance with one aspect of the present invention, the working probabilities of the probability member are formed from a set of known documents. A portion of the set of known documents is used for computing initial probabilities and a remaining portion of the set of known documents is used to measure segmentation performance of the initial probabilities and make adjustments to the initial probabilities to form the working probabilities.

Further, the processing module operates on working subseries, and in particular overlapping subseries of words in the input text stream. Preferably, the determined probability of one working sub-series of words in the text stream being of a subject topic is maintained while the probabilities for other working sub-series of words in the text stream are being determined. The probability member, for each predetermined topic, determines probability of the other working sub-series in the text stream being of the subject predetermined topic.

In accordance with another aspect of the present invention, the input text stream may be from a speech recognition system (output), an initial multimedia or video source output which has been converted into a text stream, a speech to text dictation system, and the like.

In accordance with another aspect of the present invention, the processing module further forms an index of the formed segments of the text stream as a function of the determined topic per segment. Such an index enables one to search for a segment in the text stream using topics as a search criteria. That is, the formed index cross references documents (formed segments of the text stream) according to respective topics determined for the documents/segments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

By way of overview, Applicants have built a new probabilistic model based on a combination of the HMM and the aspect model (see T. Hofmann et al., "Unsupervised Learning from Dyadic Data" in *Neural Information Processing Systems* 11, 1999 and T. Hofmann, "Probabilistic Latent Semantic Indexing" in *Proceedings of the 22nd Annual International SIGIR Conference on Research and Development in Information Retrieval*, 1999). In doing so, Applicants retain the time series approach to the problem of breaking text streams into segments that cover a single topic, while relaxing the restrictive naive Bayes assumption on the observations which as mentioned before can produce very sparse models (words not found in the document appear as zeros in the histogram).

It is noted that the aspect model has been used to date only for text indexing and clustering but nobody has applied it for topic segmentation by combining it with an HMM. This is one of the unique contributions of the present invention. By combining HMM's and aspect models, the present invention is able to automatically learn all the parameters of the model (no hand tuning required) and require totally unstructured and unlabeled data. The invention automatically learns the number of topics and assigns topic labels to each segment. In the end, the invention system outperforms the Dragon System and performs as well as the exponential model while being easier to train and at the same time providing topic labels.

Figure 1:
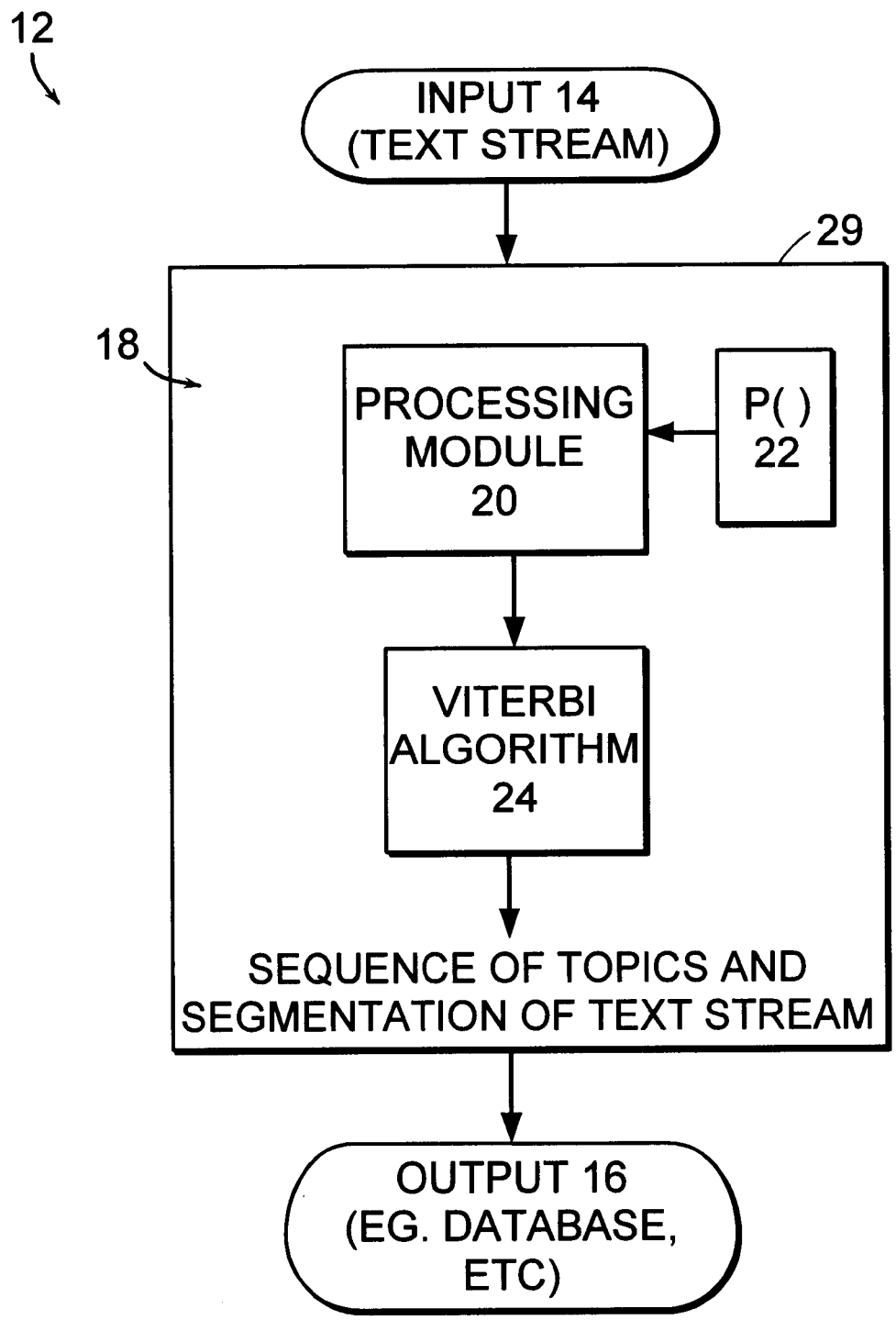
FIG. 1 is a block diagram illustrating an overview of the present invention.

Illustrated in FIG. 1 is a computer system 12 for implementing the present invention. A digital processor 29 receives an input text stream at 14 from input devices (e.g., keyboard, mouse, etc.), a software program, a database, another computer (e.g., over a communications line, the Internet, within an intranet, etc.) and the like. The digital processor 29 provides as output, documents (i.e., the input text segmented into single topic segments) and an index of the documents by topic at 16 to output devices (e.g., a display monitor, printer, etc.), software programs, another computer (coupled to processor 59 across a communications link), a results database and the like. In the preferred embodiment, the documents and indications of respective topic determined by computer system 12 are output to a database system for storage therein. In particular, the database receives and stores the documents correlated to (or in a cross-referenced manner with) indications of respective topic. As such, a database or index of documents (single topic text segments) and corresponding topic is formed by the present invention method and apparatus.

In FIG. 1 digital processor 29 stores or has loaded into its memory the invention software 18. As appropriate, processor 29 executes invention software 18 to implement the present invention. In particular, invention software 18 is formed of a probability member 22 and a processing module 20. The probability member 22 provides the probability of a document being of a predefined topic selected from a plurality of predetermined topics. That is, for each predefined topic z, the probability member 22 provides the probability of the document d belonging to that topic. This is expressed as P(d|z). Likewise, the probability member 22 provides the probability of a word w belonging to a topic, i.e., P(w|z), and the probability of a topic existing (i.e., P(z)), in the given input text stream 14.

The processing module 20 receives the input text stream 14 and divides it into working windows or sub-series of words from the series of words forming the text stream 14. The working windows or sub-series are referred to as pseudo-documents and treated as a sequence of words that cover a single topic. This assumption is made for processing purposes as further described below.

Preferably the working windows are 20 to 30 words long and shifted every 10 to 15 words or half a window.

For each working window, the processing module 20 applies the probabilities of the probability member 22 and for each topic z computes (Equations 1a and 1b respectively):

$$P(z|O_o) = P(z) \quad \text{Equation 1a}$$

$$P(z|O_i) = \frac{1}{i+1}\left(\frac{P(w_i|z)P(z|O_{i-1})}{\sum_{z'} P(w_i|z')P(z'|O_{i-1})} + \frac{i}{i+1}P(z|O_{i-1})\right) \quad \text{Equation 1b}$$

where O is the working window sub-series of words from the text stream 14 and i is the first i words. z is a given topic and z' is another predefined topic.

Next, processing module 20 transforms, using the Bayes technique to obtain an approximation of $P(O|z) \approx [P(z|10)/P(z)]$ which is the probability of the subject working window belonging to the given topic z.

Restated the pseudo-document or working window is folded into the statistics on which the probability member 22 is based. To accomplish, this the present invention 18 employs an online approximation to a single iteration of EM (Expectation Maximization) which computes $$P(z|d, w) = \frac{P(z)P(d|z)P(w|z)}{\sum_{z'} P(z')P(d|z')P(w|z')}$$ Equation 2a $$P(d|z) \cong \sum_w P(z|d, w)n(d, w)$$ Equation 2b $$P(w|z) \cong \sum_d P(z|d, w)n(d, w)$$ Equation 2c $$P(z) \cong \sum_d \sum_w P(z|d, w)n(d, w)$$ Equation 2d That is, Equations 1a and 1b are an online approximation to EM used for testing, while Equations 2a and 2b above are the full EM (no approximation) used during training as further described below.

This method of computing the P(O|z) is another unique contribution of this invention. In previous methods, the words of the working window or observation O are considered independent of each other (the naive Bayes assumption) and its probability is calculated accordingly. In the present invention method, however, the present invention exploits the probability member 22 to find the probability of the entire observation (working window) without this restrictive independence assumption.

To find this probability, processing module 20 considers the working window to be a single "document" O and wants to find P(O|z) with respect to the probabilities in probability member 22. This O however was unseen in training so one needs to perform the EM algorithm to fold the working window (document) into the parameters of the statistical model of the probability member 22. This would be extremely inefficient, but Applicants have discovered that a very efficient online approximation to a single iteration of the EM algorithm works just as well. So, the present invention 18 employs online EM and computes P(O|z).

As a consequence of the foregoing, the naive Bayes assumption (that each word in the working window or document is independent of other words) is relaxed in the resent invention. One of the main advantages of the probability member 22/statistical model supporting the processing module 20 is that it captures how the combination of words in a document contributes to its probability with respect to a given topic. For example, the word "power" when combined with "president", "congress" and "leader" would promote a different probable topic than if the word "power" co-occurred with "outage", "line" and "dark". Thus, by folding the entire working window into the statistics of probability member 22, the present invention 18 allows the unique combination of words to govern the most probable topic. With the naive Bayes assumption of the prior art, the word "power" would be split evenly between topics relating to politics and energy.

Returning to FIG. 1, the processing module 20 calculates P(O|z) for each working window that the input text stream 14 has been divided into and then slides the working window and recalculates P(O|z) for each new working window that the input text stream 14 is then divided into, and so on. From each calculated P(O|z) for each working window, the processing module 20 computes the above Equations 2a–2d and determines the sequence of topics (z's) that maximizes the likelihood of the input text stream 14 being produced.

Preferably the processing module 20 employs a Viterbi algorithm to compute said sequence of topics (z's). The Viterbi algorithm is known in the art as set forth in A. J. Viterbi, "Error bounds for convolutional codes and an asymptotically optimal decoding algorithm, *IEEE Transactions on Information Theory*, 13:260–269, 1967.

Briefly, a Viterbi algorithm is used to identify a sequence of HMM states which best matches, in a maximum likelihood sense, a respective concatenation of windows of text corresponding to an unknown sequence of topics. The Viterbi algorithm forms a plurality of sequences of tentative decisions as to what the sequence of topics was. These sequences of tentative decisions define the so-called "survival paths". The theory of the Viterbi algorithm predicts that these survival paths merge to the "maximum-likelihood path" going back in time. See G. D. Forney, "The Viterbi Algorithm," *Proceedings of the IEEE*, 761(3):268–278, March 1973. In this instance, such a maximum-likelihood path corresponds to a particular concatenation of topics which maximizes a cumulative conditional probability that it matches the unknown, stream of text given the input windows of text thereof.

Now having determined the sequence of topics (z's) represented by the input text stream 14 and corresponding division or segmentation into pseudo-documents from the above calculations, the processing module 20 detects changes or transitions between topics z. Further the processing module 20 labels each segment. In particular, the top fifteen words in the P(w|z) distribution for that topic z is employed to form the labels. To that end, the present invention enables the segments to be indexed as a function of determined topic z of the segments. With such an index, searching for a document (segment) of a particular topic in the input text stream is enabled.

Accordingly, in one embodiment, the invention software 18 outputs at 16 (a) an indication of the sequence of topics, (b) corresponding segmentations (pseudo documents) forming the input text stream 14, and (c) respective labels for the segmentations. In particular, these data (a), (b) and (c) are stored in a database. Preferably there is a respective entry in the database for each pseudo document, and for each entry there are respective fields for storing an indication of document topic and label. The field storing the indication of document topic may subsequently be queried or searched and effectively serves as an index to the pseudo documents based on topic.

Other storage or data management means for the output 16 from invention software 18 are suitable.

Figure 2:
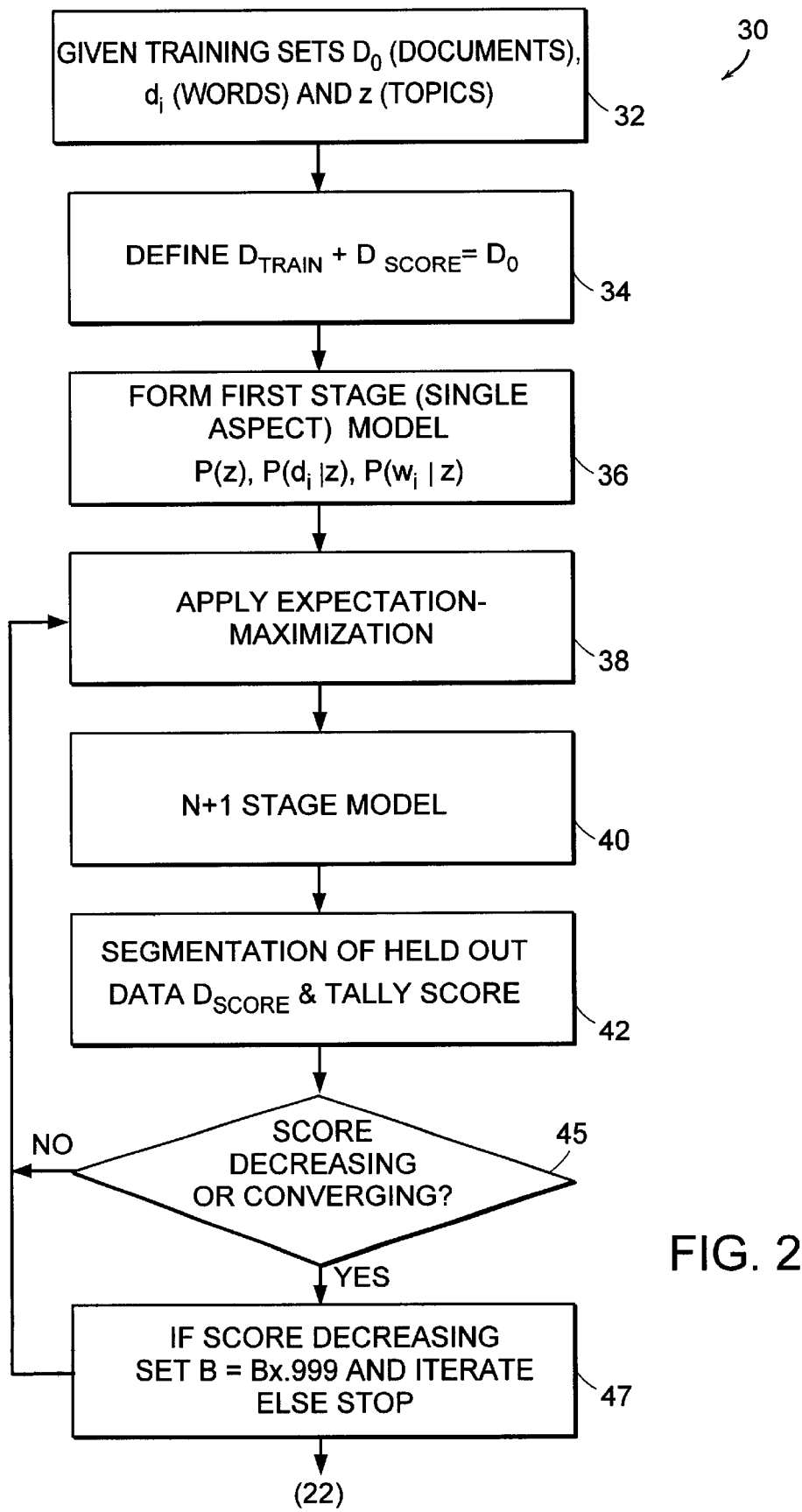
FIG. 2 is a flow diagram of model training employed in the present invention.

Turning now to FIG. 2, further details of probability member 22 are illustrated. In the preferred embodiment, the probability member 22 is a blend of a traditional hidden Markov model and an aspect based model.

As in the formation of an aspect model, an initial training set of known documents $D_0 = \{d_1, d_2 \ldots d_n \ldots d_m\}$ is given at first step 32. Each document d in the initial training set is composed of a set of words w so $d_i = \{w_1, w_2 \ldots w_k\}$ where words w are known. Also there is given a predefined set of known topics $z = \{z_1, z_2 \ldots z_i\}$. What is unknown is the topic $z_i$ of each document $d_i$ in the training set. Thus z is referred to as the hidden or latent variable.

At step 32, a portion of $D_0$ the initial training set of documents is designated for training the invention probability member 22 model. The remainder of $D_0$ (the initial training set of documents) is used for measuring how well the in-training model is segmenting (and for convergence in the training process). Although the various relative percentages of $D_0$ are suitable, in the preferred embodiment 80% of initial training set $D_0$ is used for model training and the remaining 20% is used for measuring convergence in the training process. The former is denoted as $D_{train}=\{d_1,d_2 \ldots d_n\}$ while the latter is referred to as $D_{score}=\{d_{n+1}, \ldots d_m\}$ or held out data.

As a starting point, each topic $Z_i$ is assumed to be equally probable. Each document $d_i$ belonging to a given topic z is assumed to be equally probable. And each word $w_i$ belonging to a given topic z is assumed to be equally probable.

This produces a first stage (or single aspect) model 36 having $$P(z) = \frac{1}{T}$$

$$P(d_i|z) = \frac{1}{n}$$

$$P(w_i|z) = \frac{1}{k} + c$$

where T is the number of predefined topics in given set z, n is the number of documents in set $D_{train}$, and k is the total number of words known from given documents $d_i$. A factor for noise is given as c<<1. In the preferred embodiment c is a random number in the range (0,1/K).

Next, step 38 computes the likelihood that the data set $D_{train}$ can be explained by the first stage model. This computation employs the expectation-maximization equations 2a–2d above. With regard to Equation 2a, P(z|d,w), the likelihood that a given topic z is produced by a given document-word pair d,w is equal to the product of P(z), P(d|z) and P(w|z) from the first stage model above, divided by the sum of such products for each topic $z_i$ in the given set z. That is $$P(z|d, w) = \frac{P(z)[p(d|z)P(w|z)]^B}{\sum_{z'} P(z')[P(d|z')P(w|z')]^B}$$

where B is an annealed EM constant initially equal to 1.

Then with regard to Equations 2b–2d, a second stage model (at 40 in FIG. 2) is defined as $$P(d|z) = \frac{\sum_w P(z|d, w)n(d, w)}{\sum_{d'} \sum_{w'} P(z|d', w')n(d', w')}$$

$$P(w|z) = \frac{\sum_d P(z|d, w)n(d, w)}{\sum_{w'} \sum_{d'} P(z|d', w')n(d', w')}$$

$$P(z) = \frac{\sum_w \sum_d P(z|d, w)n(d, w)}{\sum_{z'} \sum_{w'} \sum_{d'} P(z'|d', w')n(d', w')}$$

where n is the number of times the given word w appears in the given document d. d' is all documents in $D_{train}$, Z' is all topics $z_i$ in predefined topics set z. w' is all words in given known documents $d_i$.

This second stage model 40 is tested on held out data $D_{score}$ (step 42). That is P(O|z) from Equations 1a and 1b and the Bayes approximation discussed in FIG. 1 is calculated for each working window observation across $D_{score}$ and fed into the Viterbi algorithm 24 (FIG. 1). A division or segmentation of $D_{score}$ into psuedo-documents (single topic documents) results. A measure of how well the second stage model segmented $D_{score}$ is obtained by comparing the model generated segmentations to the original known boundaries between given documents $(d_{n+1}, d_{n+2} \ldots d_m)$ forming $D_{score}$. That measure or score is tallied (step 42) and the process 30 iterated from step 38.

For each iteration of steps 38, 40, 42, the respective score is tallied and detected for any decrease relative to prior tallied scores at step 45. If a decrease is detected, then the constant B is adjusted downward as shown at 47 in FIG. 2. In the preferred embodiment, B is adjusted by a factor of 0.999.

The annealed EM constant B prevents overfitting of data during the training process 30. EM is known to be prone to overfitting. Thus, annealed EM or tempered EM techniques are utilized here. Similar other techniques are suitable.

After adjusting (step 47) the annealed EM constant B, the training process steps 38, 40 and 42 are iterated as before. Additional adjustment of B and further iteration and so on are performed until convergence or a flat change between scores is detected at 45. Detection of such convergence ends the training process 30 and outputs the resulting model (P(z), P(d|z), P(w|z)) for probability member 22.

While this invention has been particularly shown and described with references to preferred embodiments thereof, it will be understood by those skilled in the art that various changes in form and details may be made therein without departing from the scope of the invention encompassed by the appended claims.

For example, certain preprocessing of the input text stream 14 (FIG. 1) may be performed before invention software 18 processes the subject text stream 14. The removal of so-called "stop words" such as "of", "a", "the", etc. may be one such preprocessing of input text stream 14. Stemming or removal of terminal parts of words (e.g., suffixes "ed", "ing", "ly", and the like) which results in root words remaining in the text stream 14, may be another such preprocessing of input text stream 14.

What is claimed is:

1. Computer apparatus for segmenting text streams, comprising:
   an input text stream formed of a series of words;
   a probability member providing working probabilities of a group of words being of a topic selected from a plurality of predetermined topics, said probability member accounting for relationship between words, and wherein the probability member is a Hidden Markov Model combined with an Aspect model; and
   a processing module coupled to receive the input text stream and using the probability member determining probability of certain words in the input text stream being of a same topic such that the processing module segments the input text stream into single topic groupings of words, where each grouping is of a respective single topic.

2. Computer apparatus as claimed in claim 1 wherein the probability member is fully automated such that working probabilities are provided in a manner free of heuristics or labeled data.

3. A method for segmenting text streams, comprising the computer implemented steps of:
   receiving an input text stream formed of a series of words;
   providing working probabilities of a group of words being of a topic selected from a plurality of predetermined topics, said working probabilities accounting for relationship between words, and wherein the step of providing working probabilities includes combining a Hidden Markov Model with an Aspect model such that use of the Aspect model is extended to text segmentation through the Hidden Markov Model; and using the working probabilities, determining probability of certain words in the input text stream being of a same topic such that the input text stream is segmented into single topic groupings of words, where each grouping is of a respective single topic.

4. A method as claim 3 wherein the step of providing working probabilities is fully computer automated and includes providing working probabilities in a manner free of heuristics or labeled data.

* * * * *